United States Patent [19]
Petrucelli

[11] 3,962,373
[45] June 8, 1976

[54] COMPOSITIONS OF 3,3,3-TRIFLUORO-2-TRIFLUOROMETHYL PROPENE/VINYLIDENE FLUORIDE COPOLYMER AND POLYTETRAFLUOROETHYLENE

[75] Inventor: Frank Petrucelli, Parsippany-Troy Hills, N.J.

[73] Assignee: Allied Chemical Corporation, New York, N.Y.

[22] Filed: Oct. 21, 1974

[21] Appl. No.: 516,712

[52] U.S. Cl............................ 260/900; 260/45.75 R; 260/45.7 R; 428/421 P
[51] Int. Cl.² .................... C08L 27/16; C08L 27/18
[58] Field of Search................ 260/900; 117/128.4, 117/161 UT

[56] References Cited
UNITED STATES PATENTS

| | | | |
|---|---|---|---|
| 3,019,206 | 1/1962 | Robb | 260/900 X |
| 3,030,260 | 4/1962 | Metzler et al. | 260/900 X |
| 3,706,723 | 12/1972 | Chandrasekaran et al. | 260/87.7 |

*Primary Examiner*—Carman J. Seccuro
*Attorney, Agent, or Firm*—Roger H. Criss; Michael S. Jarosz

[57] ABSTRACT

Composition comprising a blend of from about 25 to 99% by weight of a copolymer of 3,3,3-trifluoro-2-trifluoromethyl propene and vinylidene fluoride and correspondingly from about 75 to 1% by weight of a low molecular weight, particulate polytetrafluoroethylene resin having a maximum particle size of about 15 microns and a melt index, as hereinafter defined, in the range of about 0.5 to 20.

10 Claims, No Drawings

COMPOSITIONS OF 3,3,3-TRIFLUORO-2-TRIFLUOROMETHYL PROPENE/VINYLIDENE FLUORIDE COPOLYMER AND POLYTETRAFLUOROETHYLENE

BACKGROUND OF THE INVENTION

1. Field of the Invention

This invention relates to compositions based upon 3,3,3-trifluoro-2-trifluoromethyl propene/vinylidene fluoride copolymers.

2. Description of the Prior Art

Copolymers based upon 3,3,3-trifluoro-2-trifluoromethyl propene and vinylidene fluoride are described in U.S. Pat. No. 3,706,723 issued 1972 to Chandrasekaran et al. Such copolymers have high melting points, good thermal stability and are resistant to attack by corrosive agents. U.S. Pat. No. 3,706,723 describes these copolymers as suitable for making a wide variety of useful products, including coatings, and co-pending U.S. application Ser. No. 424,031 filed Dec. 12, 1973 of Miller et al. describes metals coated with compositions comprising these copolymers and stabilizing agents. Coatings based upon these copolymers exhibit good non-stick and non-wetting properties as well as hardness and abrasion resistance and, in many aspects, these copolymers are superior in physical properties to other fluoropolymers such as polytetrafluoroethylene. However, it has been found that with certain fluids, in particular silicone fluids coatings of these copolymers have lower non-wetting properties than desired in certain applications. It would be desirable to provide compositions based upon these copolymers which have a decreased surface energy and hence have increased non-wetting characteristics.

It has also been found that with certain substrates, coatings based upon compositions of these copolymers on substrates, such as wires and cables and fiber glass textiles, are somewhat inflexible and brittle. It would accordingly be desirable to improve the flexibility properties of coatings formed from these copolymers.

SUMMARY OF THE INVENTION

According to the present invention, a composition is provided which comprises a blend of from about 25 to 99% by weight of a copolymer of 3,3,3-trifluoro-2-trifluoromethyl propene and vinylidene fluoride and correspondingly from about 75 to 1% by weight of a low molecular weight, particulate polytetrafluoroethylene (PTFE) resin having a maximum particle size of about 15 microns and a melt index, as hereinafter defined, in the range of about 0.5 to 20. It has been found that blends comprising from 1 to about 60% by weight of the PTFE particles provide coatings with very low surface energies and hence can be utilized as non-wetting surfaces. It has also been found that blends of the compositions comprising from about 5 to about 75% by weight of PTFE particles, when coated onto substrates such as wire, cables and fiber glass cloth, have increased flexibility over coating compositions based upon the copolymer itself.

DESCRIPTION OF THE PREFERRED EMBODIMENTS

Copolymers of 3,3,3-trifluoro-2-trifluoromethyl propene and vinylidene fluoride and their preparation are fully described in the aforementioned U.S. Pat. No. 3,706,723, the disclosure of which is expressly incorporated herein. The copolymers may be prepared by copolymerizing 3,3,3-trifluoro-2-trifluoromethyl propene and vinylidene fluoride monomers by contacting the monomers in a suitable liquid copolymerization medium in the presence of a free radical generating polymerization initiator. The copolymers generally contain from about 1 to about 55 mol percent of 3,3,3-trifluoro-2-trifluoromethyl propene, preferably from about 10 to about 52 mol percent of the propene and more preferably from about 40 to about 51 mol percent, and corresponding mol percentages of vinylidene fluoride. About equimolar copolymers of 3,3,3-trifluoro-2-trifluoromethyl propene and vinylidene fluoride are especially preferred.

Finely divided, low molecular weight polytetrafluoroethylene particles are known in the art. Their preparation is described, for example, in U.S. Pat. No. 2,496,978 issued 1950 to Berry and in British patent specification 1,282,410 published in 1972. These particles may be prepared by subjecting unsintered polytetrafluoroethylene obtained by polymerization of tetrafluoroethylene in aqueous suspension or dispersion to beta or gamma radiation of intensity between 5 to 50 megarads to reduce its molecular weight and thereby degrading it into a waxy product. The radiation may be supplied by an electron beam gun or cobalt 60 and following radiation, the particles are mechanically subdivided into a fine powder of about 15 micron maximum particle size by air milling or mechanical milling procedures, such as hammermilling. The finely divided PTFE has a melt index in the range of about 0.5 to 20, preferably in the range of about 1 to 5. As used herein, the term melt index means the amount, in grams, of polymer that can be forced through a 0.0825 inch orifice of a length of 0.315 inch when subjected to a 2160 gram force in 10 minutes at 360°C. The finely divided PTFE has a melting point, as determined by differential scanning calorimetry (DSC), in the range of about 324° to 330°C.

The compositions contain from about 1 to 75% by weight of the PTFE and from about 99 to about 25% of the copolymer. For certain purposes, the compositions preferably contain from about 1 to about 60, more preferably about 5 to about 25 weight percent of the PTFE particles. For other purposes, the compositions preferably contain from about 5 to about 75, more preferably about 40 to about 60 weight percent of the PTFE. The compositions may be prepared by blending techniques well known to those skilled in the art. Preferably, the copolymer is in powder form and is dry-blended at room temperature with the PTFC particles. For this purpose, there may be employed conventional mixing apparatus such as ball mills, twin shell blenders, attrition mills and the like.

The blended compositions are preferably in powder form and any of the well-known powder coating techniques may be employed to coat the composition onto substrates. These techniques include electrostatic powder spray, fluidized bed and plasma or flame spray techniques. As these methods are conventional, they are not specifically described herein. It is preferred to use an electrostatic powder spray coating technique as the coating process. As is well known, this process provides initial adhesion of the powder composition to the substrate and the substrate is thereafter subjected to a heat treatment above the melting point of the powder to fuse or coalesce ("flow-out") the particles of the powder to form a continuous layer. In coating the blended compositions of this invention onto various substrates, it is preferred to employ flow-out temperatures in the range of about 330° to 360°C, preferably about 335° to 350°C. The duration of this heating step is dependent upon a number of factors, including the temperature employed, the coating thickness, the type and temperature of substrate, etc. In general, the flow-out times may conveniently be in the order of about 1 or 2 minutes to 1 or 2 hours or more.

In general, the substrates which may be coated with the coating compositions of this invention may be any material which can withstand the flow-out temperatures of powder spray coating or fluidized bed techniques. However, in the case of plasma spray technique, the substrate need not be resistant up to the flow-out temperature since the composition is applied in melted form to the surface and no oven baking is required. Substrates which may be utilized include metals of any shape, such as sheets, wires or cables, heat resistant textiles such as fiber glass, asbestos and graphite fibers or fabrics and thermosetting or thermoplastic plastics and the like. Preferred metal substrates are those formed of aluminum, iron or stainless steel and preferred textile substrates are those formed of fiber glass or graphite fiber. When employing metal substrates, it is preferred to pretreat the substrate prior to coating in order to obtain a roughened surface which results in a stronger adherence of the coating to the substrate. Any suitable surface treatment can be employed for this purpose such as sand or grit blasting, acid etching and the like. Fiber glass substrates may be pretreated in order to provide improved adherence to the coating by the use of such materials as coupling agents and the like, in a known manner.

When employed as a coating, the composition of the present invention may be deposited upon the substrate in any desired thickness. However, thicknesses in the range of about 0.5 to about 10 mils, especially from about 2 to about 5 mils, are preferred. When coating the blended composition onto metal substrates, it may be desirable to apply a thin coating of a composition containing the copolymer itself, without the PTFE, as a primer layer and thereafter applying the compositions of this invention as a top coating.

The compositions of the present invention may also be employed as molding compositions and extruded, injection molded, cast or otherwise formed into a variety of useful shapes.

The blended compositions of this invention provide surfaces in finished articles which are continuous and pinhole free and exhibit the hardness, abrasion resistance, chemical resistance and non-sticking characteristics of surfaces formed from the copolymer composition alone. However, it has been surprisingly found that the surfaces of articles coated with or formed from the blended composition of this invention, especially those having a preferred amount of from about 1 to about 60%, more preferably about 5 to about 25% of the PTFE particles, have a very low surface energy (low critical surface tension) as compared with the copolymer alone and hence have improved non-wetting characteristics. This is especially the case with certain fluids and, in particular, the silicones. For example, the contact angle (from which the critical surface tension can be determined) for dimethylpolysiloxane is 14° for surfaces coated with the copolymer alone and is raised to 23° for surfaces coated with a blended composition of this invention containing about 20% of the PTFE particles in addition to the copolymer.

As mentioned above, compositions of this invention preferably containing from about 5 to 75, more preferably about 40 to about 60 weight percent PTFE, have increased flexibility with respect to compositions based upon the copolymer alone. In certain applications, such as fiber glass cloth air filter bags, automotive brake cables, wire coatings and the like, it is necessary to have an abrasion resistant coating which also has a requisite amount of flexibility. With respect to fabrics, this property can also be described as "drapeability." The compositions of this invention provide such properties.

The compositions of this invention may also include various additives. Preferably, the stabilizing agents described in the aforementioned application of Miller et al are employed in an amount of about 0.2 to about 30 weight percent based upon the weight of the total composition. The stabilizing agents include oxides and salts, other than halides, of divalent metals, such as calcium oxide, magnesium oxide, barium oxide, zinc oxide cadmium oxide, lead oxide and calcium sulfate. The most preferred stabilizers are calcium oxide and zinc oxide. In addition, other additives may be incorporated into the compositions. These additives include inert fillers, lubricants, pigments, reinforcing agents such as glass fibers and the like.

The compositions of this invention, as indicated above, may be employed as coatings of various objects and are also suitable in the production of a wide variety of products including films, sheets, solid objects and the like. The melt processable compositions may be fabricated by conventional extrusion, molding and other processes. The blended compositions of this invention provide surfaces which exhibit low critical surface tensions while maintaining the hardness and abrasion resistance characteristic of the copolymer and also exhibit increased flexibility.

To further describe the invention, the following non-limiting examples are given.

EXAMPLE 1

An equimolar copolymer of 3,3,3-trifluoro-2-trifluoromethyl propene and vinylidene fluoride having a melting point of about 327°C and in the form of particles of a size ranging from about 5 to about 50 microns were dry blended in a laboratory blender at room temperature with particles of PTFE having a maximum particle size of about 15 microns and having a melt index of about 2.0 and a DSC melting point of about 328°C. The amount of the PTFE added on a weight percent is shown in Table I. The copolymer also included about 2% by weight of calcium oxide as a stabilizer. The compositions were blended for about 5 minutes to provide a powder composition.

Aluminum panels of a thickness of about 0.080 inches were sandblasted with 60 grit aluminum oxide, and coated on both sides, using an electrostatic powder spray coating apparatus, with a powder composition of an equimolar copolymer of 3,3,3-trifluoro-2-trifluoromethyl propene and vinylidene fluoride having a melting point of about 327°F and containing 2% by weight calcium oxide, the particle size of the powder ranging from about 5 to about 50 microns. The panels were supported in a hot air oven maintained at 345°C and retained in the oven for 20 minutes to permit the primer copolymer to flow out into a continuous layer of thickness of about 1 mil.

Using the same coating apparatus, the panels were thereafter coated on both sides with the powder compositions of the present invention. The panels were supported in a hot air oven maintained at a temperature of about 345°C and remained in the oven for about 20 minutes to permit the compositions to flow out into a continuous layer of thickness of about 1.5 mils.

The contact angle of the coatings were measured with droplets of dimethylpolysiloxane liquid having a viscosity of 100 cps. The results are shown in Table I. The contact angle with water droplets were also measured and are shown in Table I.

Table I

| Sample | Weight % PTFE | Contact Angles (Degrees) Dimethylpolysiloxane | Water |
|---|---|---|---|
| control | 0 | 13 | 106 |
| 1 | 5 | 20 | 106 |
| 2 | 10 | 22 | |
| 3 | 20 | 23 | |

EXAMPLE 2

Steel automotive brake wire, 30 inches long and of a diameter of about 61 mils, was coated with a composition comprising 50% PTFE powder as described in Example I and 50% of the copolymer composition described in Example I. The total thickness of the coating was about 1 mil. Control coatings were also made using the copolymer composition alone as the coating. The wires were flexed in the following manner:

A tubular sleeve formed of an equimolar copolymer of ethylene and chlorotrifluoroethylene was placed over the coated wire with the ends of the wire being exposed. The sleeve was draped over a 10 inch diameter mandrel so that 120 degrees of the mandrel's circumference was covered by the sleeve. The sleeve was held stationary with respect to the mandrel and the wire was free to move therein. One end of the wire was affixed to a 6 pound weight and the other end to an oscillating device which provided reciprocal movement over a distance of two inches. The number of oscillating cycles required to wear the wire through the sleeve was measured and are shown in Table II.

Table II

| Sample | Weight % PTFE | Flex Cycles before Wear |
|---|---|---|
| control | 0 | 260,590 |

Table II-continued

| Sample | Weight % PTFE | Flex Cycles before Wear |
|---|---|---|
| control | 0 | 201,570 |
| 1 | 50 | >603,559 |
| 2 | 50 | >603,559 |

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

I claim:

1. A blended composition in powder form comprising from about 25 to about 99 weight percent of a copolymer of 3,3,3-trifluoro-2-trifluoromethyl propene and vinylidene fluoride and from about 75 to about 1 weight percent of a low molecular weight, particulate polytetrafluoroethylene resin having a maximum particle size of about 15$\mu$ and a melt index of about 0.5 to 20.

2. The composition of claim 1 comprising about 40 to about 99 weight percent of said copolymer and about 60 to about 1 weight percent of said polytetrafluoroethylene.

3. The composition of claim 2 comprising about 80 to about 95 weight percent of said copolymer and about 25 to about 5 weight percent of said polytetrafluoroethylene.

4. The composition of claim 1 comprising about 25 to about 95 weight percent of said copolymer and about 75 to 5 weight percent of said polytetrafluoroethylene.

5. The composition of claim 4 comprising about 40 to about 60 weight percent of said copolymer and about 60 to about 40 weight percent of said polytetrafluoroethylene.

6. The composition of claim 1 wherein said copolymer contains from about 1 to about 55 mol percent of 3,3,3-trifluoro-2-trifluoromethyl propene and correspondingly from about 99 to about 45 mol percent of vinylidene fluoride.

7. The composition of claim 5 wherein said composition includes a stabilizing agent.

8. The composition of claim 1 wherein said melt index is in the range of about 1 to 5.

9. A coated article coated with the composition of claim 1.

10. The coated article of claim 9 wherein the substrate is a metal.

* * * * *